March 11, 1969
L. VAUTREY
3,432,047
MECHANISM FOR EFFECTING THE POSITIONAL ADJUSTMENT
OF NUCLEAR REACTOR CONTROL RODS
Filed Sept. 15, 1966
Sheet 3 of 5
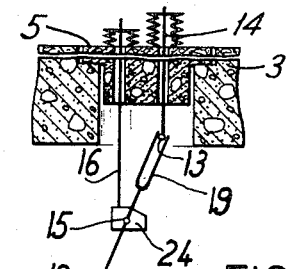
FIG. 4
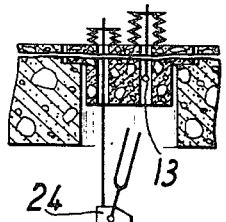
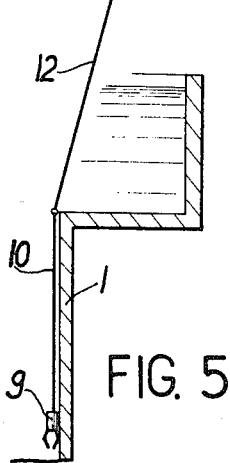
FIG. 5
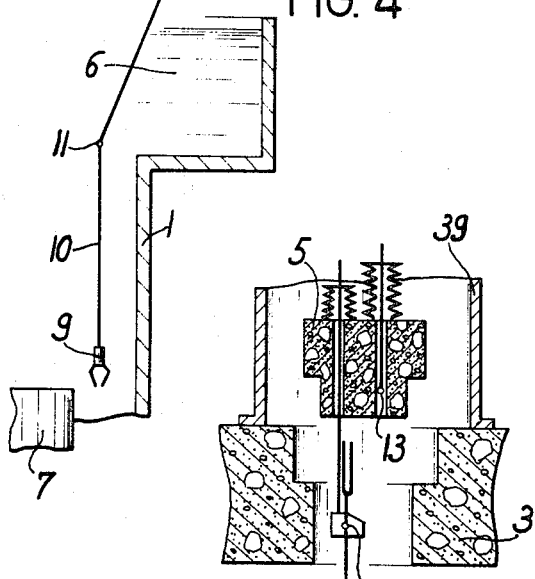
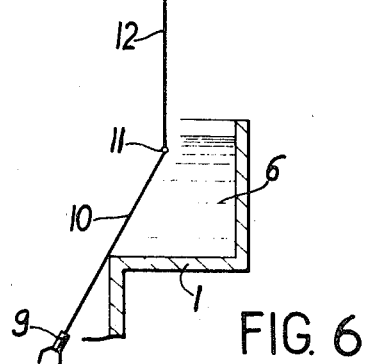
FIG. 6

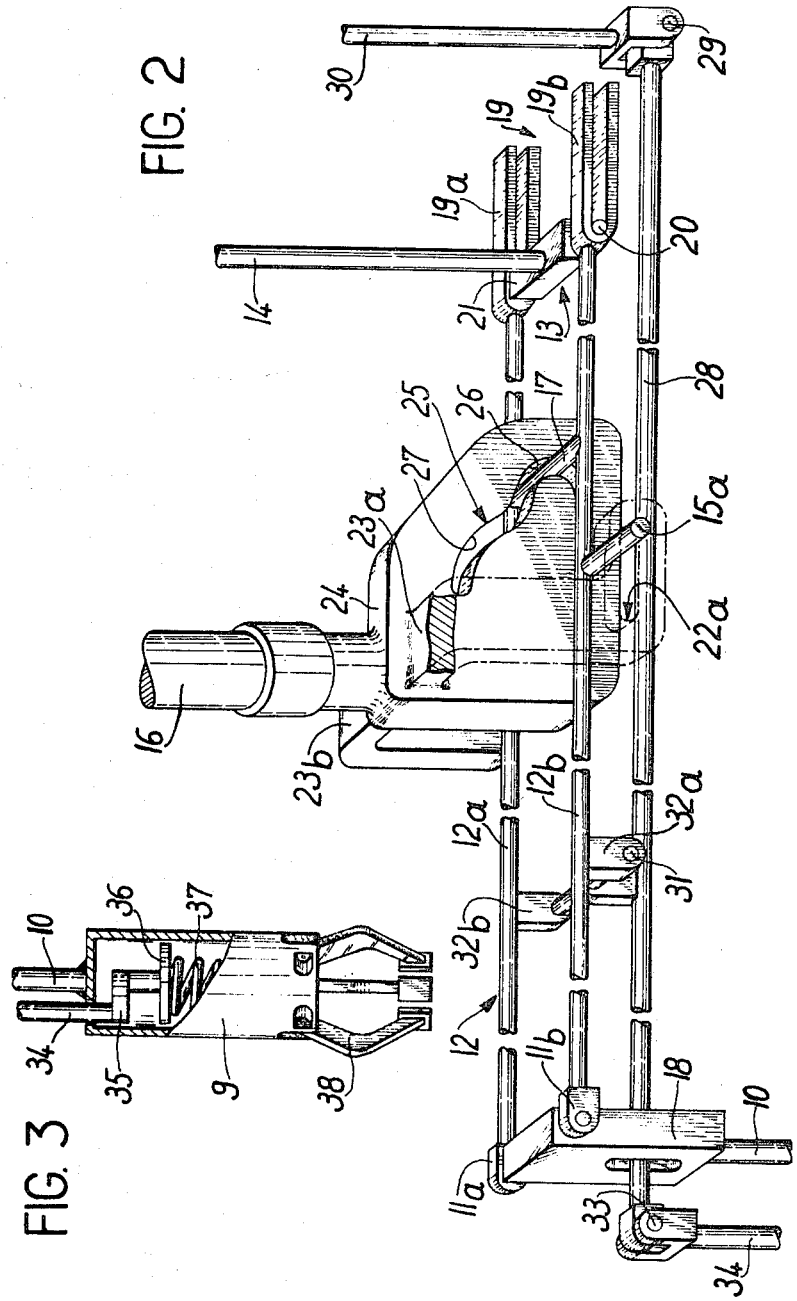

United States Patent Office 3,432,047
Patented Mar. 11, 1969

3,432,047
MECHANISM FOR EFFECTING THE POSITIONAL ADJUSTMENT OF NUCLEAR REACTOR CONTROL RODS
Louis Vautrey, Paris, France, assignor to Commissariat à l'Energie Atomique, Paris, France
Filed Sept. 15, 1966, Ser. No. 579,607
Claims priority, application France, Oct. 22, 1965, 35,970
U.S. Cl. 214—27    6 Claims
Int. Cl. B66d 3/02; G21c 19/20

ABSTRACT OF THE DISCLOSURE

Nuclear reactor control rod positioning mechanism comprising a control rod grab and a system of rods and levers to position and actuate the grab. The mechanism to position the grab includes first and second vertical rods coupled by intermediate rods. The grab is attached to the end of the second vertical rod. The grab operating mechanism comprises first and second vertical rods coupled by an intermediate rod with the lower end of the second rod being coupled to a pusher cam system to operate the jaws of the grab.

---

The present invention relates to a mechanism for effecting the positional adjustment of nuclear reactor control rods and especially, although not exclusively, for displacing the control rods of a so-called fast reactor in which the fuel elements are cooled by a flow of liquid metal.

It is known that, in reactors of this type, the control rod or safety rod drive mechanisms are usually housed in vertical cylindrical guide tubes which traverse the top portion of the biological shield structure and are thus introduced through this latter into the reactor core. The driving members are located on the top face of the reactor tank and the control rods are usually operated by means of grabs fitted at the ends of these mechanisms. Leak-tightness of the passageway which is provided through the biological shield wall is usually ensured by means of bellows seals which are capable of substantial movements of extension, thereby permitting sufficient travel of the safety rods within the reactor core. However, bellows seals of this type are difficult to construct by reason of the fact that they must be capable, not only of undergoing a movement of extension or elongation which is equal to the range of travel of the control rods, but also of withstanding the stresses which arise from fast control-rod drops and especially from the violent impulses which are transmitted to the initial folds of the bellows seals. In the case of a high-power reactor, the range of travel which is necessary becomes greater than one meter, and it therefore becomes virtually impossible to construct bellows seals which are capable of satisfying the particular conditions of operation.

In other reactors, the positional adjustment of the control rods can be effected by means of mechanisms which drive the rods from underneath the reactor. However, mechanisms of this type are liable to interfere with the structural arrangement of the core and liquid metal feed system; moreover, difficult problems arise when the subsequent disassembly of these mechanisms has to be contemplated.

The present invention relates to a mechanism which makes it possible to overcome the above-noted disadvantages in large measure, primarily insofar as it permits of easy disassembly and dispenses with long-extension bellows seals by providing for a system of articulated rods which are operated directly from outside the biological shield structure of the reactor.

The mechanism referred to is mainly characterized in that it comprises three operating members which are pivotally coupled to each other and constituted respectively by a first vertical operating member which terminates in a control rod grab, by an intermediate member which forms a lever arm and by a second vertical operating member which extends outside the reactor tank, said intermediate member being provided with at least one transverse fulcrum-pin which is pivotally mounted in bearings secured to a vertical support rod which also extends outside the reactor tank.

The position of the transverse fulcrum-pin of the intermediate member thus defines the range of travel of the second vertical operating member as well as the resulting range of travel of the first vertical operating member which supports a control rod by means of the grab. Leak-tightness of the biological shield wall of the reactor at the point which is traversed by the second vertical operating member can readily be ensured by means of a bellows seal, the deformations of which are as limited in extent as may be desired. It should be noted that leak-tightness is also provided around the vertical support rod which supports the transverse fulcrum-pin; however, said support rod is stationarily fixed in the operating position of the mechanism, and consequently the maintenance of such leak-tightness does not give rise to any practical difficulty.

In a particular embodiment of the invention, the intermediate member of the drive mechanism is composed of two parallel rods which are each provided with a transverse fulcrum-pin, both fulcrum-pins being located in the line of extension of each other and said two parallel rods being interconnected by a cross-pin which is guided within a suitably shaped slot formed in a vertical plate carried by the support rod, said vertical plate being provided on each face thereof with a lateral extension terminating in an elongated slot which forms a bearing for the corresponding transverse fulcrum-pin.

In addition, and in accordance with a further characteristic feature, the intermediate member terminates at one end in a fork in which is engaged a pivot-pin for the second vertical operating member, said fork being intended to permit any lateral movements of the intermediate member and second operating member when said members perform either simultaneous or separate movements.

Finally, the drive mechanism is associated with a grab-operating mechanism which serves to duplicate the three articulated operating members, said grab-operating mechanism being constituted by a first vertical rod which causes the grab to open as a result of the displacement of said vertical rod, a relay rod which is pivoted about a pin carried by the intermediate member of the mechanism and a driving rod which is pivotally attached to the extremity of said relay rod.

All of the above features which are preferably employed in combination but which may if necessary be employed independently of each other will be brought out by the following description of one example of construction which is given by way of indication only and not in any sense by way of limitation, reference being made to the accompanying drawings, in which:

FIG. 2 is a view in perspective showing the constructional details of one section of the drive mechanism herein described.

FIG. 3 is a view of the handling grab which is associated with the mechanism of FIG. 1.

FIGS. 4, 5 and 6 are three diagrammatic views which illustrate the method adopted for the disassembly of the mechanism under consideration and for the withdrawal of said mechanism from the reactor.

Figure 1:
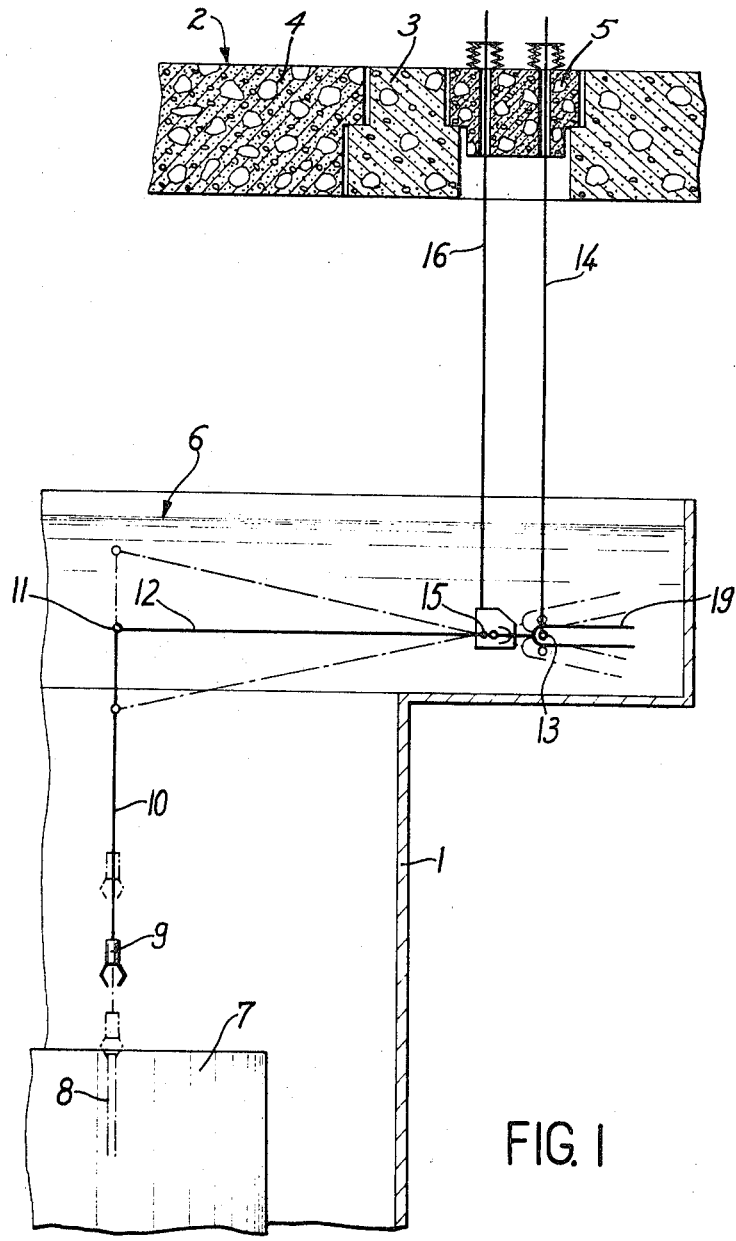
FIG. 1 is a diagrammatic view of a driving mechanism as constructed in accordance with the invention and mounted inside a nuclear reactor tank.

Only the essential elements which are conducive to a proper understanding of the invention have been shown in the figures.

There are shown diagrammatically in FIG. 1 the tank 1 and a portion 2 of the biological shield wall of a nuclear reactor. Said wall 2 is made up of a shield slab 3 through which are formed openings which provide access to the reactor tank 1 and which are normally closed off by means of shield plugs such as the plugs 4 and 5. The reactor tank 1 is filled with a liquid medium 6 which, in the exemplified embodiment under consideration, is a flow of liquid metal. The reactor core, which is shown diagrammatically at 7, is completely immersed in the liquid medium 6 and is made up of an assembly of fuel elements (not shown) through which elements commonly referred to as control rods can be inserted. One control rod is shown in the drawing and is designated by the reference numeral 8.

The handling of a control rod, that is to say the insertion of said rod into the fuel elements of the core 7 or the withdrawal of said rod therefrom according to the conditions of operation or shutdown of the reactor, is carried out by means of a grab 9 secured to the end of a rod 10 which can be driven in vertical translational motion between two end positions in which the grab 9 is located at one of the levels shown diagrammatically in the drawing in chain-dotted lines. The vertical translational movement of the rod 10 thus effects the insertion or withdrawal of the control rod 8, this movement being performed by means of a drive mechanism which is constructed in accordance with the invention.

As illustrated in the drawing of FIG. 1, the aforesaid drive mechanism mainly comprises, in addition to the first vertical rod 10 referred to above, an intermediate member 12 which is pivotally coupled at 11 to the rod 10, and a second vertical rod 14 which is pivotally coupled at 13 to that extremity of the member 12 which is remote from the articulated coupling 11. Said member 12 is pivoted about a fulcrum-pin 15 which is coupled with a support rod 16, said support rod being stationarily fixed in position with respect to the reactor tank 1 under normal operating conditions. The extremities of the vertical rods 14 and 16 extend upwardly and traverse in leak-tight manner the shield plug 5 which closes off the biological shield slab 3.

The constructional arrangement of the above-described drive mechanism is illustrated in FIG. 2 in greater detail. The intermediate member 12 is composed in this case of two parallel rods 12a and 12b which are interconnected by a cross-pin 17, whilst the articulations 11a and 11b of the corresponding extremities of the rods 12a and 12b provide a coupling between said rods and a plate 18 which is rigidly fixed to the upper extremity of the vertical rod 10, the lower extremity of which supports the grab 2. At the other end, the rods 12a and 12b terminate in two forks 19a and 19b which are disposed in parallel relation and between which the articulation 13 is adapted to slide, said articulation 13 being constituted by a pivot-pin 20 which is integral with a connecting-piece 21 which is in turn rigidly fixed to the lower end of the rod 14. Finally, there is fixed on each of the rods 12a and 12b a pivotal-motion fulcrum-pin 15a or 15b (only the fulcrum-pin 15a being visible in the figure). Each fulcrum-pin is adapted to cooperate with an elongated slot 22a or 22b which is formed in the extremity of a lug 23a or 23b, each lug being joined in a symmetrical manner to an intermediate vertical plate 24 which is placed between the two parallel rods 12a and 12b. The plate 24 is rigidly fixed to the lower extremity of the rod 16 which supports the complete drive mechanism. The two rods 12a and 12b are positioned with respect to the plate 24 by means of the cross-pin 17 which is adapted to cooperate with a slot 25 formed in the plate, said slot being formed in two parts or sections which are joined to each other, one slot section being designated by the reference numeral 26 and having the shape of an elliptical arc whilst the second slot section which is designated by the reference numeral 27 has the shape of a circular arc.

The drive mechanism in accordance with the invention is completed by a grab-operating mechanism which is associated therewith and which makes it possible to initiate the opening or closing motion of the grab 9 in any position thereof. The said grab-operating mechanism comprises an intermediate relay rod 28 which is pivotally coupled at one end by means of a pin 29 to a vertical driving rod 30 which is consequently parallel to the rods 14 and 16 referred to above. The displacement of said rod 30 initiates the pivotal motion of the rod 28 about a pin 31 carried by two bearing-brackets 32a and 32b which are respectively integral with the rods 12a and 12b. The other end of the rod 28 is pivotally coupled by means of a pin 33 to a second vertical rod 34, the lower end 35 of which terminates in a piston 36 (as shown in FIG. 3) which applies pressure on a spring 37 and initiates the opening motion of the jaws 38 of the grab 9 by means of a pusher-cam system which is not shown in the drawings.

The operation of the mechanism hereinabove described is as follows: the positioning of the grab 9 which supports a safety rod 8 above the reactor core is controlled externally of this latter, and in particular from a control station which is located above the shield slab 3, by imparting a suitable movement of vertical displacement to the rod 14. It should be noted that it is always possible in any position to initiate the fast insertion of a control rod which accordingly performs the function of a safety rod for controlled shutdown of the reactor. To this end, the control rod is propelled towards the core by means of a rapid movement of the rod 14 which is produced by the expansion of a spring or any other suitable arrangement.

Once the reactor is completely shut down, it may prove necessary to carry out various fuel-element handling operations. With this object in mind, it is an advantage to effect the withdrawal of the drive mechanism described above, especially with a view to completely clearing the area above the reactor core 7. FIG. 4 is a diagrammatic illustration of the manner in which this operation is performed. When the grab 9 is open, the complete mechanism is raised to a sufficient height by producing action simultaneously on the rods 14 and 16 up to the position shown in the figure, in which the grab moves completely clear of the core area. During this movement, the rods 16 and 14 move vertically at a constant distance from each other, whereupon the rod 14 alone continues to perform its movement, which is made possible by the presence of the forks 19a and 19b whereby the pivot-pin 20 is permitted to slide within said forks. The movement can then continue as shown in FIGS. 5 and 6 so as to permit the withdrawal of the mechanism from the reactor tank before the lower vertical rod 10 comes into contact with the tank 1 or no later than that moment. The rod 14 passes out of the ends of the forks and is then fully released, as shown in FIG. 5. In this position, the entire drive mechanism can be removed together with the shield plug 5 into the interior of a shield hood 39 which has been moved into position over the shield slab 3 (as shown in FIG. 6), and can thus be withdrawn from the reactor.

A certain number of constructional details are also shown in FIG. 2 which make it possible in particular to operate the control rod drive mechanism with a high degree of flexibility and precision. Accordingly, the control rod 8 must necessarily move on a same vertical line as it travels within the reactor core. For this purpose, the fulcrum-pins 15a and 15b of the rods 12a and 12b are capable of effecting a small movement of horizontal displacement within the elongated slots 22a and 22b by virtue of the suitable width of these latter. Moreover, as a result of the pivotal motion of the rods 12a and 12b about the fulcrum-pins 15a and 15b, the cross-pin 17 follows an elliptical path which corresponds to the above-mentioned horizontal displacement of said fulcrum-pins within the elongated slots 22a and 22b. The vertical movement of the grab must therefore necessarily take place if the cross-pin 17 in fact describes such a path, which explains the configuration of the guide slot 25 in the section 26 thereof. Furthermore, it is the arcuate configuration 27 of the upper profile of the slot 25 which continues to effect the guidance of the cross-pin 17 during the operations which are shown in FIGS. 4 to 6, in which the drive mechanism is either moved aside to the periphery of the core area or withdrawn from the reactor.

Among the advantages which are provided by the drive mechanism under consideration, special emphasis should be laid on the small range of travel of the operating rod which results from a suitable choice of the position of the pivotal-motion fulcrum-pin. Leak-tightness of the passageway through the shield structure can readily be ensured by means of different expedients, in particular by means of a mechanical bellows seal which, under the conditions referred to above, need only carry out a small movement of extension. Moreover, the control units of the mechanism are always located at a distance from the reactor core and may thus be designed and installed without any consideration of space requirements, which is not the case in direct vertical drive systems. Finally, by virtue of the particular arrangement of the different articulations, a movement of withdrawal of limited amplitude of the vertical rods of the mechanism makes it possible to clear the core area completely, which may be necessary in order to permit fuel element handling operations.

As will be readily understood, the invention is not limited in any sense to the mode of construction which has been described in reference to the accompanying drawings and which has been given solely by way of example; in particular, the drive mechanism can be employed in conjunction with control rods which are used in order to provide either safety protection, coarse control or fine control of the reactor. In the case of fine reactivity control, the pivotal-motion fulcrum-pin must simply be displaced so that the operating rod should have a longer travel.

I claim:

1. A mechanism for effecting the positional adjustment of nuclear reactor control rods in a reactor tank comprising three operating members pivotally coupled to each other and consisting of a first vertical operating member, a control rod grab at the end of said first member, an intermediate member forming a lever arm and a second vertical operating member extending outside the reactor tank, a vertical support rod extending out of the reactor tank, at least one transverse fulcrum pin for said intermediate member pivotally mounted in bearings on said vertical support rod, a grab operating mechanism for said control rod grab duplicating said three operating members, said grab operating mechanism comprising a first vertical rod for opening said grab, a relay rod pivoted on a pin carried by said intermediate member and a driving rod pivoted to the extremity of said relay rod.

2. A mechanism as described in claim 1 including a biological shield wall for the reactor, said second vertical operating member passing through said wall and a bellows seal subjected to slight deformation between said second member and said wall.

3. A mechanism as described in claim 1, said intermediate member being composed of two parallel rods, a transverse fulcrum pin for each of said rods, said fulcrum pins being aligned, a crosspin connecting said two parallel rods, a vertical plate, a guide slot in said plate receiving and guiding said crosspin, said plate being mounted on said support rod, a lateral extension on each side of said vertical plate and an elongated slot in each of said extensions forming a bearing for the corresponding one of said transverse fulcrum pins.

4. A mechanism as described in claim 3, the profile of said guide slot being a connected elliptical arc and circular arc.

5. A mechanism as described in claim 3, each of said elongated slots providing small horizontal displacement of the associated one of said fulcrum pins.

6. A mechanism as described in claim 1, said intermediate operating member terminating at one end in a fork and a pivot pin in said fork for said second vertical operating member.

References Cited

UNITED STATES PATENTS

| 3,130,841 | 4/1964 | Trickett | 214—28 |
| 3,136,432 | 6/1964 | Nicoll et al. | 214—28 |
| 3,253,995 | 5/1966 | Antonsen et al. | |

ROBERT G. SHERIDAN, *Primary Examiner.*

U.S. Cl. X.R.

176—30